United States Patent [19]

Heintz

[11] 4,073,741

[45] Feb. 14, 1978

[54] COBALT OXIDE CHLORATE CANDLE

[75] Inventor: Clifford E. Heintz, Buffalo, N.Y.

[73] Assignee: A-T-O Inc., Willoughby, Ohio

[21] Appl. No.: 664,279

[22] Filed: Mar. 5, 1976

[51] Int. Cl.² .................... A62B 21/00; C01B 13/02
[52] U.S. Cl. ................................. 252/187 R; 23/281; 44/7.5; 252/186; 423/240; 423/643
[58] Field of Search ............ 252/187 R, 186; 23/281; 423/240, 643; 44/7.5

[56] References Cited

U.S. PATENT DOCUMENTS

| | | | |
|---|---|---|---|
| 2,469,414 | 5/1949 | Schecter | 252/187 R |
| 3,174,936 | 3/1968 | Gustafson | 252/187 R |
| 3,207,695 | 9/1965 | Gustafson | 252/187 R |
| 3,702,305 | 11/1972 | Thompson | 252/187 R |
| 3,749,678 | 7/1973 | Thompson | 252/187 R |

OTHER PUBLICATIONS

Rudloff et al., Jour. Phy. Chem., vol. 74, No. 18 (1970), pp. 3317-3324.
Wydeven, Jour. Catalysis, vol. 19, (1970), pp. 162-171.

Primary Examiner—Benjamin R. Padgett
Assistant Examiner—Irwin Gluck
Attorney, Agent, or Firm—Christel & Bean

[57] ABSTRACT

A substantially fuel-free oxygen-generating composition consisting essentially of an alkali metal chlorate which may contain a small amount of perchlorate, in combination with a catalytic amount in the order of about 0.5 to 5.0% by weight of cobalt oxide.

18 Claims, No Drawings

COBALT OXIDE CHLORATE CANDLE

FIELD OF THE INVENTION

This invention relates to a chemical oxygen generator, and more particularly to a candle formed from alkali metal chlorates and perchlorates with cobalt oxides. Upon initiation, by locally raising the candle temperature to a critical point, a self-sustaining reaction occurs wherein substantially pure oxygen is produced with less heat evolution.

DESCRIPTION OF THE PRIOR ART

Chemical oxygen generators or "candles" formed of chlorates or perchlorates of the alkali metals are well known. U.S. Pat. No. 3,702,305 to Thompson, issued Nov. 7, 1972, which is hereby incorporated by reference, teaches the use of sodium and potassium oxides with a mixture of alkali metal chlorates to maintain a catalytic decomposition without the addition of heat or fuel. U.S. Pat. Nos. 2,469,414; 2,558,756; 2,775,511; 3,207,695; 3,276,846; and 3,293,187 are further illustrations of the prior art and are briefly described in the Thompson U.S. Pat. No. 3,702,305. These patents depend on a substance which acts as a fuel to maintain combustion. However, the fuel (Fe, Mn, Mg, etc.) causes undesirable heat generation with losses of oxygen output and production of undesirable gases (Cl, CO, $CO_2$, etc.) which must be removed.

The effect of various catalysts on the decomposition of alkali metal chlorates is discussed in Rudloff et al, "Journal of Physical Chemistry", Vol. 74, No. 18 (1970), pp. 3317–3324, and Wydeven, "Journal of Catalysis", Vol. 19 (1970), pp. 162–171. Cobalt oxides are disclosed and thermogravimetric data is presented. However, there is no indication that the reaction is self-sustaining without external heating, that the composition would be useful in an oxygen candle, nor how to employ the composition in a fuelfree oxygen candle.

SUMMARY OF THE INVENTION

This invention relates to the generation of oxygen by the decomposition of an alkali metal chlorate composition which may contain a small amount of perchlorates employing cobalt oxide as catalytic material. The rate of oxygen generation may be altered by changing the percentage of cobalt oxide present, by varying the amount of rate modifying additives employed, or both. Rate modifying additives include, for example, aluminosilicate ceramic fiber filler material, silicon dioxide and barium peroxide and may be employed individually or in combination.

U.S. Pat. No. 3,702,305, briefly described above, while producing oxygen having a high degree of purity, also produces an ash which is caustic. On the addition of water thereto, sodium hydroxide is produced with the generation of considerable heat. In a number of areas of utilization this is undesirable. The invention described herein results in an ash which is non-caustic and which does not result in an excessive generation of heat on the addition of water. For use of such oxygen generator in passenger aircraft, for example, the avoidance of caustic material and heat generation is highly desirable, if not essential. In addition, the composition shown in U.S. Pat. No. 3,702,305 has an affinity for moisture which could lead to considerable difficulties unless great care is taken in the manufacture, storage and handling of the candles described therein.

Among the objects of this invention are: To provide a novel chemical oxygen generator which 1. relies on catalytic decomposition rather than thermal decomposition;
2. produces high purity oxygen;
3. has less heat generation;
4. has a high rate of oxygen generation;
5. has an active oxygen source and a decomposition catalyst wherein the rate of oxygen generation may be varied by varying the percentage of catalyst present;
6. has alkali metal chlorate with 0 to a small amount of alkali metal perchlorate as the active oxygen source, a cobalt oxide catalyst and barium peroxide, silicon dioxide or an aluminosilicate ceramic fiber or other filler, wherein the rate of oxygen generation may be varied by varying the percentage of filler employed;
7. produces an ash which may be mixed with water without causing any substantial increase in temperature; and wherein the ash produced is non-caustic; and
8. is of the chlorate type which does not employ fuel.

Other objects of the invention will become apparent from the following specification and claims.

DESCRIPTION OF PREFERRED EMBODIMENTS

It has been found that cobalt oxide acts as a catalyst for the decomposition of alkali metal chlorates and perchlorates in a chlorate candle, eliminating the need for fuels such as iron, charcoal, magnesium, manganese, etc., to supply heat for the decomposition. This results in lessened heat evolution and in oxygen of higher purity, free of undesirable contaminants such as chlorine, carbon monoxide and carbon dioxide.

Alkali metal chlorates, either alone or in mixtures with a small amount of alkali metal perchlorate, are employed and serve as the active oxygen source. The rate of oxygen generated may be varied by altering the amount of catalyst present in the composition, and also by varying the amount of filler employed. The total quantity of oxygen produced depends on the weight of reactants. Thus, oxygen generators which may vary as to the rate of generation, total oxygen generation capacity, and size can be produced.

Broadly, the composition of this invention comprises an alkali metal chlorate which may include a small amount of alkali metal perchlorate with cobalt oxide as a catalyst with substantial absence of any fuel material. Additionally, there may be present fillers or excipients in the composition. Silicon dioxide is one example of an inert filler which may be employed. Barium peroxide is useful as a filler although, strictly speaking, it is not inert in that it also serves to react with any chlorine produced. However, for the purposes of this disclosure, it is referred to as an excipient. The presence of excipients lowers the rate of oxygen liberation and they can be employed to control the reaction.

The cobalt oxides preferably employed are CoO or $Co_3O_4$ or mixtures thereof. While the preferred chlorate and perchlorates are the sodium compounds, for reasons of economy, other alkali metal salts may be employed if desired.

It has been discovered that the use of certain proportions of aluminosilicate fibers permits the control of catalytic decomposition. The reaction may be speeded up or slowed down within certain limits to set the amount of oxygen generated in a given time. An aluminosilicate ceramic fiber such as "Kaowool Ceramic Fiber-XE", a product of Babcock and Wilcox Co. has been found useful for this purpose. This high purity, amorphous product has a fiber diameter of about 3 microns, a fiber length of about ¼ inch, and an aluminosilicate composition of about 45.1% $Al_2O_3$ and 52% $SiO_2$.

While it is not certain that the effect produced by the use of cobalt oxides is truly catalytic in nature, cobalt oxides do bring about the rapid non-explosive decomposition of the chlorates and perchlorates with the accompanying release of oxygen. Accordingly, even though the cobalt oxides are not recovered in their original form after the decomposition has occurred, for the sake of conciseness and the purposes of this invention they will be referred to as "catalysts".

Commercially available $Co_3O_4$ has been found to be generally suitable for use as a catalyst in the decomposition reaction. However, cobalt oxide (CoO) of the ordinary commercial grade has proven to be generally unsuitable for the effective practice of this invention. I have found that CoO catalyst which yields desirable results may be made according to the following methods:

a. Cobalt$^{++}$ hydroxide, $Co(OH)_2$, is heated to 260° C in the absence of air until the weight of the charge is stabilized. Cobalt oxide is formed according to the equation:

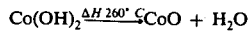

b. Cobalt$^{++}$ carbonate is heated to 260° C in the absence of air until the weight of the charge is stabilized. Cobalt oxide is formed according to the equation:

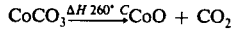

c. Cobalt$^{++}$ oxide (CoO) is heated to 260° C in the absence of air until the weight of the charge is stabilized.

The cobalt oxide (CoO) after treatment is stored in closed moistureproof containers until needed.

The ingredients of the oxygen-generating composition are mixed together, preferably in finely divided form. This may be accomplished by simple mechanical mixing, or the components may be ground or pulverized together, as in a ball mill, to obtain intimate contact and thorough mixing. Obtaining uniform burns in the chlorate candle is enhanced by the thoroughness of mixing of the ingredients and the fineness of grinding.

The following compositions, given in weight percent, are illustrative of the invention:

|  | Broad Range | Preferred Range |
| --- | --- | --- |
| sodium chlorate | 85–98 | 96 |
| sodium or potassium perchlorate | 0–1.0 | 0–0.5 |
| CoO | 0.5–5.0 | 1.5 |
| $Co_3O_4$ | 0–2.0 | 0 |
| $BaO_2$ | 0–5.0 | 0–4 |
| $SiO_2$ | 0–8.0 | 0–1.0 |
| ceramic fiber (Kaowool Ceramic Fiber-XE) | 0–3.0 | 0–1 |

The composition is formed into a candle in a hydraulic press or by casting as disclosed in U.S. Pat. No. 3,702,305. An ignition cone and first fire mixture, which may have the composition taught in said patent, are incorporated in the candle during its fabrication. Further examples in weight percent of a cone and first fire composition are: (cone) 30 $NaClO_3$, 30 Fe, 15 $BaO_2$ and 25 fiberglass; (first fire) 66 $NaClO_3$, 25 Fe, and 9 fiberglass.

$NaClO_3$ melts endothermically at 260° C with rapid exothermic decomposition commencing at 478° C and being completed at 570° C, producing NaCl and $O_2$. The cobalt oxide catalyst employed lowers the initial decomposition temperature to about the melting point of pure sodium chlorate. Thermal gravimetric analysis and differential thermal analysis tests were run with varying percentages of CoO and $NaClO_3$:

| % (by weight) CoO in Mix | Melt Temp. ° C | Decomposition Temperature ° C | |
| --- | --- | --- | --- |
| | | Started | Ended |
| 2 | 250 | 265 | 400 |
| 4 | 250 | 260 | 395 |

The above tests show that by employing CoO as decomposition catalysts, the melting temperature of the mixture is approximately the same as that of pure $NaClO_3$, but that the initial decomposition temperature is lowered approximately 200° C and the terminal decomposition temperature is lowered approximately 170° C.

The following examples in which all percentages given are by weight are illustrative of the invention:

EXAMPLE 1

A generator composition consisting of sodium chlorate ($NaClO_3$) 89% (commercial grade - Hooker Chemical Co., Buffalo, New York), 5% barium peroxide ($BaO_2$), 2% silicon dioxide ($SiO_2$), and 4% cobalt oxide (CoO) is dry mixed, approximately 2.0% of distilled water then added and mixed until homogeneous. This mixture is poured into a cylindrical mold cavity. The mold is then closed and placed in a hydraulic press and compressed with a force of 5 tons. Thereafter the top section of the mold is removed and an ignition cone composition with approximately 5.0% $H_2O$ added is poured into the mold on top of the compressed core. The mold is then reassembled and compressed to 2 tons with a finished length of 6⅝ inches – 6¾ inches, and diameter of approximately 1.4 inches.

A core consisting of the compressed composition is removed from the mold and placed in a ventilated oven at 133° C for 14 hours. Moistened flash (first fire mix) is added to the top of the cone and dried.

A disc of ceramic fiber mat is placed on the first fire end. This is to prevent sparks from being thrown out. The first fire may be ignited by percussion, torch, electrical means, water or fluid chemical ignition, or a match. This in turn ignites the cone, which ignites the core and the decomposition proceeds to completion in approximately 20 minutes.

By comparing the weight of the generator prior to and after the burn, the weight of the oxygen evolution can be measured. An oxygen yield of approximately 41% or 105 liters is generally obtained.

EXAMPLE 2

A generator composition consisting of sodium chlorate ($NaClO_3$) 89%, 5% of barium peroxide ($BaO_2$), 2% silicon dioxide ($SiO_2$), and 4% cobalt oxide (CoO) are dry mixed until homogeneous. This mixture is poured into a flexible mold with a cone and first fire mix being placed on top. The filled mold is assembled in an isostatic press and compressed with 14,000 psi pressure.

Ignition of the candle is accomplished as in Example 1. Decomposition proceeds for 25 minutes with an oxygen yield of 40.9%.

EXAMPLE 3

The sodium chlorate, barium peroxide, silicon dioxide, cobalt oxide mixture of Example 1 can be prepared by heating to a viscous slurry and casting the slurry into a stainless steel mold. After cooling, the ignition cone and first fire mixture are placed into cavities provided by the mold. This cast oxygen generator is then ignited and decomposes in 21 minutes with 41.6% $O_2$ yield.

EXAMPLE 4

A generator composition consisting of sodium chlorate ($NaClO_3$) 98%, 2.0% cobalt oxide (CoO) is dry mixed until homogeneous. This mix is poured into the flexible mold, with the ignition cone and first fire mix being placed on top. The mold is compressed in an isostatic press to 14,000 psi pressure.

Ignition of the candle is accomplished as in Example 1. Decomposition proceeds for 19 minutes with an oxygen yield of 41.8%.

EXAMPLE 5

A generator composition consisting of sodium chlorate ($NaClO_3$) 93%, 5.0% barium peroxide ($BaO_2$), 2.0% cobalt oxide (CoO) is dry mixed until homogeneous. This mix is poured into a flexible mold, with ignition cone and first fire mix being placed on top, and compressed in an isostatic press to 14,000 psi pressure.

Ignition of the candle is accomplished as in Example 1. Decomposition proceeds for 20 minutes with oxygen yield of 41.3%.

EXAMPLE 6

This example illustrates the use of aluminosilicate ceramic fiber filler material, namely Babcock & Wilcox "Kaowool Ceramic Fiber"-XE, to speed up or slow down catalytic decomposition rate. The fiber is prepared by baking at 760° C for one half hour to remove organic matter and moisture.

a. A candle with a composition of 2% $SiO_2$, 2% CoO, 2% XE Fiber, and 94% $NaClO_3$ is fabricated, pressed, packed and ignited. Burn time is 6.8 minutes with an average flow rate of 15.54 liters per minute (lpm).

b. The above composition is altered to an XE Fiber percentage of 1%. The burn time is 12 minutes with an average flow rate of 8.75 lpm.

c. With the same composition but with XE Fiber omitted, the burn time is 19.1 minutes with an average flow rate of 5.66 lpm.

d. Same composition but with 3% of XE Fiber; burn time is 4.8 minutes, with average flow rate of 22.9 lpm.

This example illustrates that increasing the percentage of XE Fiber increases the burn rate of the subject compositions.

EXAMPLE 7

A generator composition consisting of sodium chlorate ($NaClO_3$) 90%, 4% cobalt oxide (CoO), 2% silicon dioxide ($SiO_2$), 2% barium peroxide ($BaO_2$) and 2% of XE Fibers is dry mixed until homogeneous. The mixture is then poured into a flexible mold with the ignition cone and the first fire mix being placed on top and compressed in an isostatic press with 14,000 psi pressure.

Ignition of the candle is accomplished as in Example 1. Decomposition proceeds for 12 minutes with oxygen yield of 41.4%.

EXAMPLE 8

A core of 1% CoO, 8% $SiO_2$, 3% $BaO_2$ and 88% $NaClO_3$ is pressed at 14,000 psi in an isostatic press. After removal it is packed in a vermiculite packing within a steel canister and ignited. The burn averaged 4 lpm for 26.2 minutes. The maximum canister temperature is 175° C.

EXAMPLE 9

A core of 3% CoO, 8% $SiO_2$, 2% $BaO_2$ and 87% $NaClO_3$ is pressed in an isostatic press to 14,000 psi pressure. After removal it is packed in vermiculite within a steel canister and cold soaked at $-17C$ for 3 hours. It is ignited with no warm-up period. The burn averaged 6.25 lpm for 16.8 minutes. The maximum canister temperature was 177° C with 1.5 second start.

EXAMPLE 10

A core of 1.5% CoO, 1.5% $BaO_2$ and 97% $NaClO_3$ is pressed in an isostatic press to 14,000 psi pressure. After removal it is ignited. Ignition is accomplished as in Example 1. Decomposition proceeds for 18 minutes with an oxygen yield of 41.7%.

EXAMPLE 11

A core of 1.5% CoO, 1.5% $BaO_2$, 96.5% $NaClO_3$ and 0.15% $NaClO_4$ is pressed and ignited as set forth in Example 10. Decomposition proceeds for 17.5 minutes with an oxygen yield of 41.6%.

Without wishing to be bound by any theory, the addition of ceramic fibers to the composition appears to open channels within the composition and this results in a shorter burn time. Asbestos, calcium oxide and probably other materials can be used for this purpose. Barium peroxide and silicon dioxide appear to act as diluents and tend to slow down the rate of oxygen generation. Other diluents which are inert to the oxygen generation reaction could be employed with similar results. The amount of these additives which can be employed can be varied. Obviously, the quantity should not be so large as to adversely affect the decomposition reaction or the rate of oxygen generation. The necessary amount for the desired effect can readily be determined by simple tests.

While a pressure of 14,000 psi is shown in the examples in forming the candles, any pressure above 6,000 psi may be employed. The range of 6,000 psi to 14,000 psi is generally satisfactory, and higher pressures yield the more desirable denser products.

What is claimed:

1. A substantially fuel-free oxygen-generating candle comprising a compressed active oxygen source consisting essentially of an alkali metal chlorate with from 0 to about 1% of alkali metal perchlorate;
   a sufficient amount of cobalt oxide selected from the group consisting of CoO and mixtures of CoO and $Co_3O_4$ to maintain a self-sustaining catalytic decomposition admixed therewith;
   said mixture being substantially fuel-free; and
   an ignition material on an end of the candle whereby when ignited the candle generates oxygen by relatively low temperature catalytic decomposition of the chlorate.

2. The oxygen-generating candle of claim 1 containing in addition an excipient component comprising 0 to a minor amount of $BaO_2$ and 0 to a minor amount of $SiO_2$, at least one of said components being present.

3. The oxygen-generating candle of claim 1 wherein the mixture comprising the candle consists essentially of about 1.5% $BaO_2$, about 1.5% CoO and about 97% $NaClO_3$.

4. A substantially fuel-free oxygen candle composition which when ignited generates oxygen in a self-sustaining reaction without additional heat or added fuel material;

said composition, in weight percent, consisting of an intimate mixture of active generating components and a minor percentage of substantially fuel-free excipient components;

the active substantially fuel-free oxygen-generating components consisting essentially of 0 to about 1% alkali metal perchlorate, an alkali metal chlorate, and a sufficient amount of cobalt oxide selected from the group consisting of CoO and mixtures of CoO and $Co_3O_4$ to maintain a self-sustaining catalytic decomposition;

the substantially fuel-free excipient components comprising to 0 to a minor amount of $BaO_2$ and 0 to a minor amount of $SiO_2$, at least one of said components being present, to modify the rate of the reaction;

the alkali metal chlorate and perchlorate being present in an amount to make the total percentage of components in the composition 100%.

5. The composition of claim 4 wherein the CoO is present in a range of from about 0.5 to about 5.0% and the $Co_3O_4$ is present in a range of from 0 to about 2.0%.

6. The composition of claim 2 wherein the $BaO_2$ is present in a range of from 0 to about 4%, the $SiO_2$ is present in a range of 0 to about 1%, the alkali metal perchlorate is present in a range of from 0 to about 0.5%, and the CoO is the sole cobalt oxide and is present in 1.5% with the balance being essentially sodium chlorate.

7. The composition of claim 1 which consists essentially of about 1.5% $BaO_2$, about 1.5% CoO and about 97.0% of $NaClO_3$.

8. The composition of claim 1 which consists essentially of about 1.5% $BaO_2$, about 1.5% CoO, about 0.15% $NaClO_4$ and about 96.5% $NaClO_3$.

9. The composition of claim 1 which consists essentially of about 5% $BaO_2$, about 2% $SiO_2$, about 4% CoO and about 89% $NaClO_3$.

10. The method of producing substantially pure oxygen which comprises igniting a fuel-free composition comprising an active oxygen source consisting essentially of an alkali metal chlorate with from 0 to about 1% of alkali metal perchlorate and a sufficient amount of cobalt oxide selected from the group consisting of CoO and mixtures of CoO and $Co_3O_4$ to maintain a self-sustaining catalytic decomposition without additional heat or added fuel material.

11. The method of claim 10 wherein the alkali metal is sodium.

12. The method of claim 11 wherein the rate of oxygen liberation is increased by increasing the amount of cobalt oxide.

13. The method of claim 11 wherein the composition contains in addition an excipient whereby the rate of oxygen liberation is decreased.

14. The method of claim 13 wherein the excipient is up to about 3% barium peroxide.

15. The method of claim 13 wherein the excipient is up to about 8% silicon dioxide.

16. The method of claim 11 where the composition consists essentially of about 1.5% $BaO_2$, about 1.5% CoO and about 97% $NaClO_3$.

17. The method of obtaining oxygen at relatively low temperatures which comprises igniting a candle comprising a compressed active oxygen source consisting essentially of an alkali metal chlorate with from about 0 to 1% of alkali metal perchlorate admixed with a sufficient amount of cobalt oxide selected from the group consisting of CoO and mixtures of CoO and $Co_3O_4$ to maintain a self-sustaining catalytic decomposition without additional heat, the said mixture being substantially fuel free.

18. The method of claim 17 wherein the mixture comprising the candle consists essentially of about 1.5% $BaO_2$, about 1.5% CoO and about 97% $NaClO_3$.

* * * * *

UNITED STATES PATENT AND TRADEMARK OFFICE
CERTIFICATE OF CORRECTION

PATENT NO. : 4,073,741
DATED : February 14, 1978
INVENTOR(S) : Clifford E. Heintz It is certified that error appears in the above-identified patent and that said Letters Patent are hereby corrected as shown below:

Claim 6, line 1, change "2" to --4--.

Claim 7, line 1, change "1" to --4--.

Claim 8, line 1, change "1" to --4--.

Claim 9, line 1, change "1" to --4--.

Signed and Sealed this

Fifteenth Day of April 1980

[SEAL]

Attest:

Attesting Officer

SIDNEY A. DIAMOND

Commissioner of Patents and Trademarks